United States Patent
Vandame et al.

(10) Patent No.: US 12,555,316 B2
(45) Date of Patent: Feb. 17, 2026

(54) TECHNIQUES FOR PROCESSING MULTIPLANE IMAGES

(71) Applicant: InterDigital CE Patent Holdings, SAS, Paris (FR)

(72) Inventors: Benoit Vandame, Betton (FR); Didier Doyen, Cesson-Sevigne (FR); Frederic Babon, Chateaubourg (FR); Remy Gendrot, Montgermont (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 263 days.

(21) Appl. No.: 18/044,696

(22) PCT Filed: Sep. 24, 2021

(86) PCT No.: PCT/EP2021/076306
§ 371 (c)(1),
(2) Date: Mar. 9, 2023

(87) PCT Pub. No.: WO2022/063953
PCT Pub. Date: Mar. 31, 2022

(65) Prior Publication Data
US 2023/0326128 A1    Oct. 12, 2023

(30) Foreign Application Priority Data

Sep. 24, 2020 (EP) .................................... 20306088

(51) Int. Cl.
| | |
|---|---|
| *G06T 17/00* | (2006.01) |
| *G06T 7/70* | (2017.01) |
| *H04N 13/111* | (2018.01) |
| *H04N 13/282* | (2018.01) |

(52) U.S. Cl.
CPC ............... *G06T 17/00* (2013.01); *G06T 7/70* (2017.01); *H04N 13/111* (2018.05); *H04N 13/282* (2018.05)

(58) Field of Classification Search
None
See application file for complete search history.

(56) References Cited

U.S. PATENT DOCUMENTS

| | | | |
|---|---|---|---|
| 2020/0219290 A1 | 7/2020 | Tourapis et al. | |
| 2020/0228777 A1* | 7/2020 | Dore | H04N 13/161 |
| 2022/0138990 A1* | 5/2022 | Fleureau | G06T 9/001 |
| | | | 382/232 |

FOREIGN PATENT DOCUMENTS

EP    3246881 A1    11/2017

OTHER PUBLICATIONS

Vandame Benoit et al., "Pipeline for Real-Time Video View Synthesis", Jul. 2020, 6 pages.
Eric Penner et al., "Soft 3D Reconstruction for View Synthesis", Nov. 2017, 11 pages.

* cited by examiner

Primary Examiner — Nurun Flora
(74) Attorney, Agent, or Firm — Flaster Greenberg P.C.

(57) ABSTRACT

A device, an apparatus and associated methods are provided. In one embodiment, the method comprises obtaining a multi-plane image (MPI) representation of a three dimensional (3D) scene. The MPI representation includes a plurality of slices of content from the 3D scene, each slice corresponding to a different depth relative to a position of a first virtual camera. Each slice is decomposed into regular tiles; and the orientation of each tile is determined.

20 Claims, 13 Drawing Sheets

TECHNIQUES FOR PROCESSING MULTIPLANE IMAGES

This application is the 371 National Stage of International Application No. PCT/EP2021/076306, filed Sep. 24, 2021, which claims the benefit of European Patent Application No. 20306088.4, filed Sep. 24, 2020, the entire contents of which are incorporated herein by reference.

TECHNICAL FIELD

The present disclosure generally relates to volumetric video capture and more particularly to volumetric video captures that use multiplane image formats.

BACKGROUND

Volumetric video capture is a technique that allows moving images, often in real scenes be captured in a way that can later be viewed later from any angle. This is very different than regular camera captures that are limited in capturing images of people and objects from a particular angle. In addition, video capture allows the captures of scenes in a three-dimensional (3D) space. Consequently, data that is acquired can then be used to establish immersive experiences that are real or generated by a computer. With the growing popularity of virtual, augmented and mixed reality environments, volumetric video capture techniques are also growing in popularity. This is because the technique uses visual quality of photography and mixes it with the immersion and interactivity of spatialized content. The technique is complex and combines many of the recent advancements in the fields of computer graphics, optics, and data processing.

The resulting immersive experiences appear extremely realistic but have the drawback of handling a large amount of data. The management and storage of this data, even on a temporary basis, is both expensive and challenging. Consequently, it is desirous to provide solutions that reduce the amount of data that needs to be managed and stored without affecting the speed and quality of the final product.

SUMMARY

In one embodiment, apparatus and associated methods are provided. In one embodiment, the method comprises obtaining a multi-plane image (MPI) representation of a three dimensional (3D) scene. The MPI representation includes a plurality of slices of content from the 3D scene, each slice corresponding to a different depth relative to a position of a first virtual camera. Each slice is decomposed into regular tiles; and the orientation of each tile is determined.

In a different embodiment a device and associated method is provided to render a view of a 3D scene. The method comprises obtaining an encoded MPI representation of the 3D scene. The encoded MPI representation comprising one of a bitstream or an atlas. The encoded MPI representation is then decoded to obtain a plurality of tiles, orientation information for each tile of the plurality, and information associating each tile to a slice of the MPI representation and a position within the slice, wherein each slice corresponds to a different depth relative to a position of a first virtual camera. A stacked representation of the slices are then constructed. Each slice comprising the tiles associated to the slice, each tile is oriented according to the orientation information of the tile. Finally the content from the stacked representation of the slices is projected to a merged image. The merged image representing a view of the 3D scene from a position of a second virtual camera.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION OF PREFERRED EMBODIMENTS

Figure 1A:
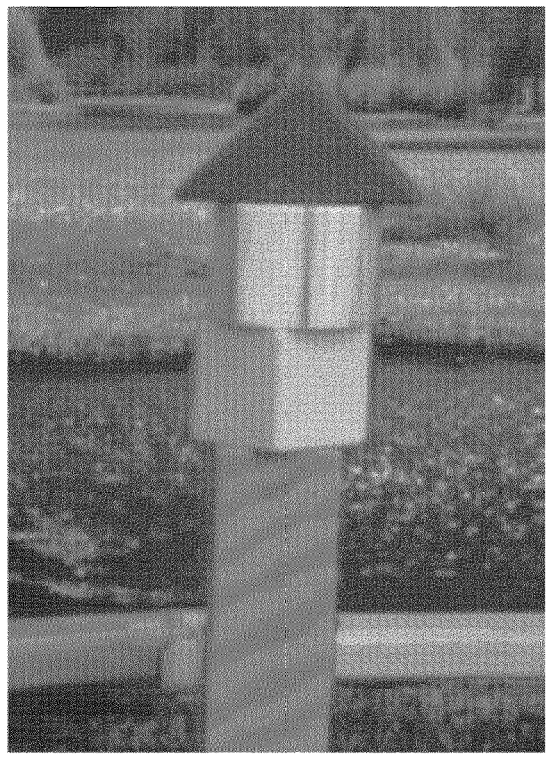
FIG. 1A is an illustration of a virtual image computed for a first position of a projective camera located at the middle of one or more cameras.
Figure 1B:
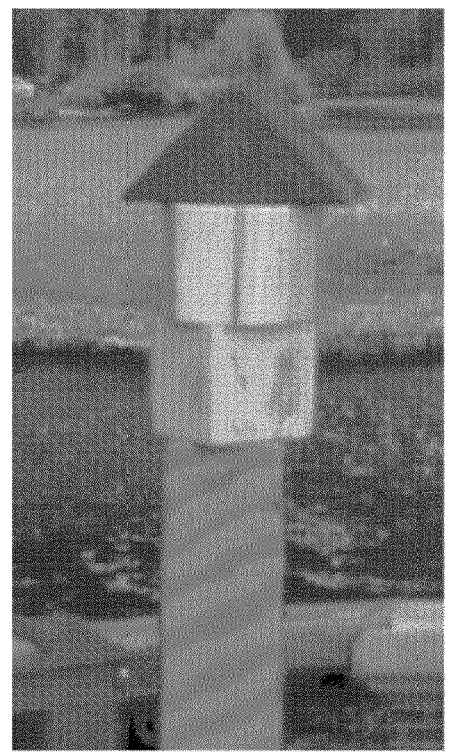
FIG. 1B is an illustration of a virtual image computed for a projective camera located at a particular distance on the left from the middle of one or more real cameras.

FIGS. 1A and 1B are illustrations of a virtual image computed for two positions of a projective camera. FIG. 1A is computed for the projective camera as if located at the middle of one or more cameras, while FIG. 1B is computed for the projective camera to be located at a particular distance (in this case 30 cm) on the left from the middle of the one or more real cameras. In this particular example, the real cameras were bound into a square of 21 cm from each side. In both cases a tiled multiplane images (MPI) was created.

An MPI is a camera-centric, layered 3D representation of images used to create final renderings that are extremely detail oriented and can be used in a number of immersive technologies. MPI is a multi plane image which is often an intermediate data object used to compute a synthetic image.

It consists in a collection of planes (or slices) which defines a cube of data. The planes are perpendicular to the optical axis of the virtual camera for which a synthetic image is computed from the real cameras. MP's are used to provide very detail-oriented images of both real and computer-generated views.

In the example of FIGS. 1A and 1B, the MPI created were the same and were computed based on 200 slices. The tile sizes were of 7 pixels each. The slices are more visible in FIG. 1B, around the scratches in the tower poles and roof. They correspond to the background which is visible through the slices that hold the details of the tower.

MPI's can be computed with deep learning applications. Often MP's are used to provide view synthesis that can then be used in a variety of applications including deep learning applications. Image view synthesis describes an algorithm which permits an image to be computed from the scene observed from a position which has not been captured by the matrix of cameras. The extrinsic and intrinsic parameters of the virtual camera can be freely defined. The quality of a synthetized image will be good when the virtual camera is sharing the same intrinsic parameters as the real camera(s).

View synthesis aims at creating a final rendering starting from a number of pictures taken from given points of view. There are several problems associated with the current state of art, however, that need to be addressed. One problem has to do with the challenges of building any synthetic image from a number of given camera settings and orientations that may be real or virtual. The final rendering of this synthetic image is desirously taken from a virtual camera placed in a given location and with given settings.

Figure 7B:
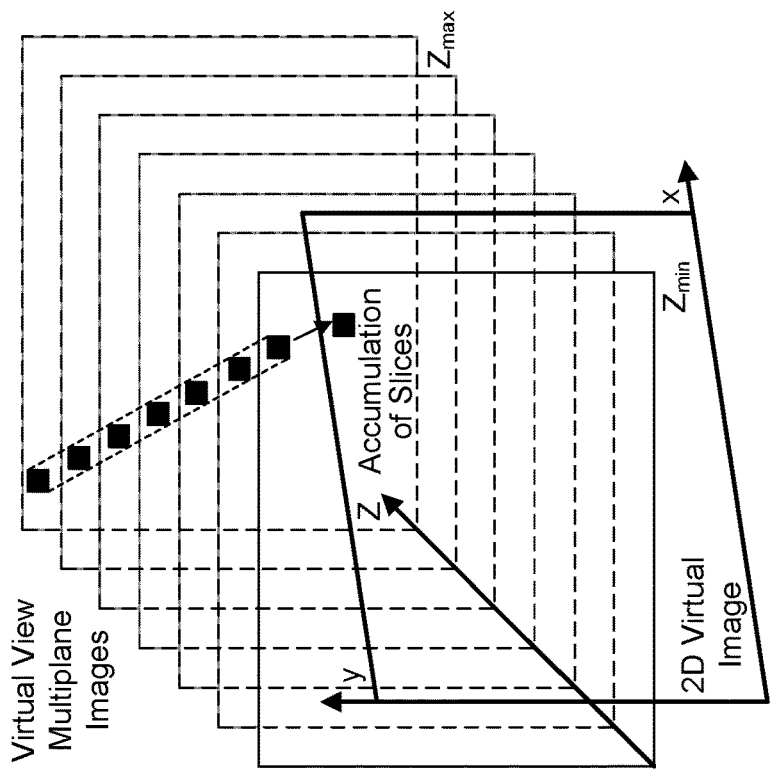
FIG. 7B is the merging with a perspective projection(s) according to one embodiment.
Figure 7A:
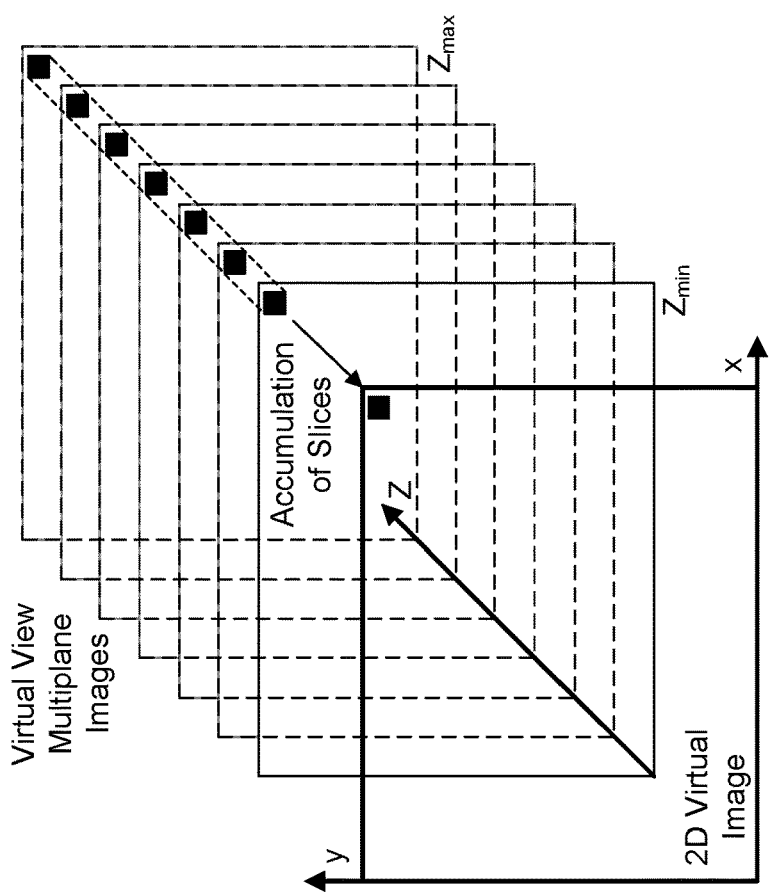
FIG. 7A is an illustration of the merging of color cubes per 2D coordinates according to one embodiment.

Another challenge has to do with the fact that MPI planes are defined perpendicular to the optical axis of the virtual camera, and that existing MPI techniques restrict the content of each slice to lie on the flat plane associated with the slice. The MPI is encoded by keeping tiles made from images or slices of images to a reasonable volume that can be stored. The size of the tiles for MPI depends on the number of slices defined in the MPI. Interpolated views are then generated from the tiled MPI which also depends on the number of slices provided. Having a large number of tiles, however, requires a large amount of data to be stored which becomes problematic as mentioned. Therefore a solution to add for each tile some information that will help at the end to reduce the number of slices and the number of tiles to be stored in a tiled MPI can be one way to address these challenges as will be discussed with one embodiment. In this embodiment, the global size of the tiled MPI is reduced for a given picture quality of view synthesis. FIGS. 7A and B will provide more information regarding to this embodiment at a later point. In FIGS. 7A and B as will be discussed, the computation of a virtual view from the MPI is made possible. Additionally, the tiled MPI can be either stacked to produce the virtual view from the virtual camera for which the MPI has been computed (FIG. 7A) or the MPI can be projected to whatever projection camera to produce many different virtual views (FIG. 7B).

In a different embodiment, the virtual views (see equation (12)), can be used to approximate a complete algorithm that can then be used in conjunction with view renderings. In this embodiment, the tiled MPI are computed for projective cameras which allow for a faster rendering generation. One challenge in such areas is to avoid visible defects that occur when the projective camera is disposed outside of the boundaries defined by the real cameras. In such a case the embodiment uses view extrapolations to allow for the projection planes from the tiled MPI and the planes of the slices to become visible.

Volumetric video capture techniques had been made possible through the growing advancements in the fields of computer graphics, optics, and data processing amongst which are evolutions in the developments of cameras that capture images in a particular manner. One such camera is a light field camera that can be used in generation of MP's because it provides multiple views of the same scene simultaneously.

Light-Field cameras allow real content to be captured from various point of views. The two major families of light-field cameras are either: the matrix of cameras; or the plenoptic cameras. A matrix of cameras can be replaced by a single camera which is used to perform many acquisitions from various point of views. The light-field being captured is therefore limited to a static scene. With plenoptic cameras, a micro-lens is located between the main-lens and the sensor. The micro-lenses produce micro-images which correspond to various point of views. The matrix of micro-images collected by the sensor can be transformed into so-called sub-aperture images which are equivalent to the acquisition obtained with a matrix of cameras. Embodiments of are described considering a matrix of cameras, but would apply equally well to the set of sub-aperture images extracted from a plenoptic camera.

Camera calibration is important and involve a set of algorithms and special images which are acquired in order to estimate the so-called extrinsic- and intrinsic-parameters. The extrinsic parameters describe the position of the cameras in a real World Coordinate System—3 translations to characterize the position of centre of the main-lens pupil, and 3 rotation angles to characterize the orientations of the main optical axis of the cameras. The intrinsic parameters describe the internal properties of each camera such as the focal length, the principal point, the pixel size. It might also include the geometric distortion produced by the main-lens which distorts the captured images compared to an ideal thin lens. Many calibration procedures rely on a checkerboard which is observed many times from various point of views.

Cameras can be calibrated geometrically. In a scenario where there are N cameras, the N cameras are calibrated using for instance a black and white checkerboard which is simultaneously observed by all cameras. Several pictures are taken with the checkerboard positioned at different positions from the cameras. On each picture, the 2D coordinates of the corners delimited by 2 black and 2 white squares of the checkerboard are extracted. From one image, the 2D coordinates of the corners are associated with the 2D coordinates of the same corners observed by the other cameras.

With the N 2D coordinates of corners observed by the N cameras and also for the different exposures, it is possible to estimate the position of the cameras according to a World Coordinate System (WCS). In this system, the centre of the pupil of the main-lens from camera $i \in [1,N]$ is positioned in space by a translation vector $T_i=(X,Y,Z)^t$, and the orientation of the optical axis is defined by a 3D rotation matrix $R_i$. The pose matrix of the camera i is defined by $P_i=(R_i\ T_i) \in \mathbb{R}_{3 \times 4}$. The extrinsic matrix of the camera i is defined by $Q_i=(R_i^{-1}\ -R_i^{-1} \cdot T_i) \in \mathbb{R}_{3 \times 4}$. The intrinsic camera parameters: focal length; principal point; pixel size; geometrical distortion are estimated simultaneously with the extrinsic camera parameters.

With camera calibration it is possible to convert a 2D pixel coordinate (x,y) from one camera i into a 3D WCS coordinate $(X,Y,Z)^t$ for any distance z between the camera i to the object visible at pixel (x,y). It is also possible from any point in space $(X,Y,Z)^t$ to compute its coordinate observed at pixel (x,y) from camera i.

Point Clouds are one or more sets of 3D points in the WCS. Each 3D point is associated with an RGB color. Point clouds can be easily obtained from a Multi-View plus Depth (MVD) by throwing each RGB pixel into the WCS knowing the camera calibration parameters, and the corresponding depth.

Another important concept is that of Depth-map estimation. With a light-field camera, a given object in a scene is observed many times with a varying parallax. It is therefore possible to estimate the distance of that object from all cameras. One deduces a so-called depth-map where each pixel quantifies the distance of objects which are visible in the corresponding image acquired by a given camera.

When using MVDs, a set of images obtained by the matrix of cameras is designated, plus a corresponding set of depth-map images. One depth-map is associated with one image, it shares the same spatial resolution and same viewing positions.

Figure 2:
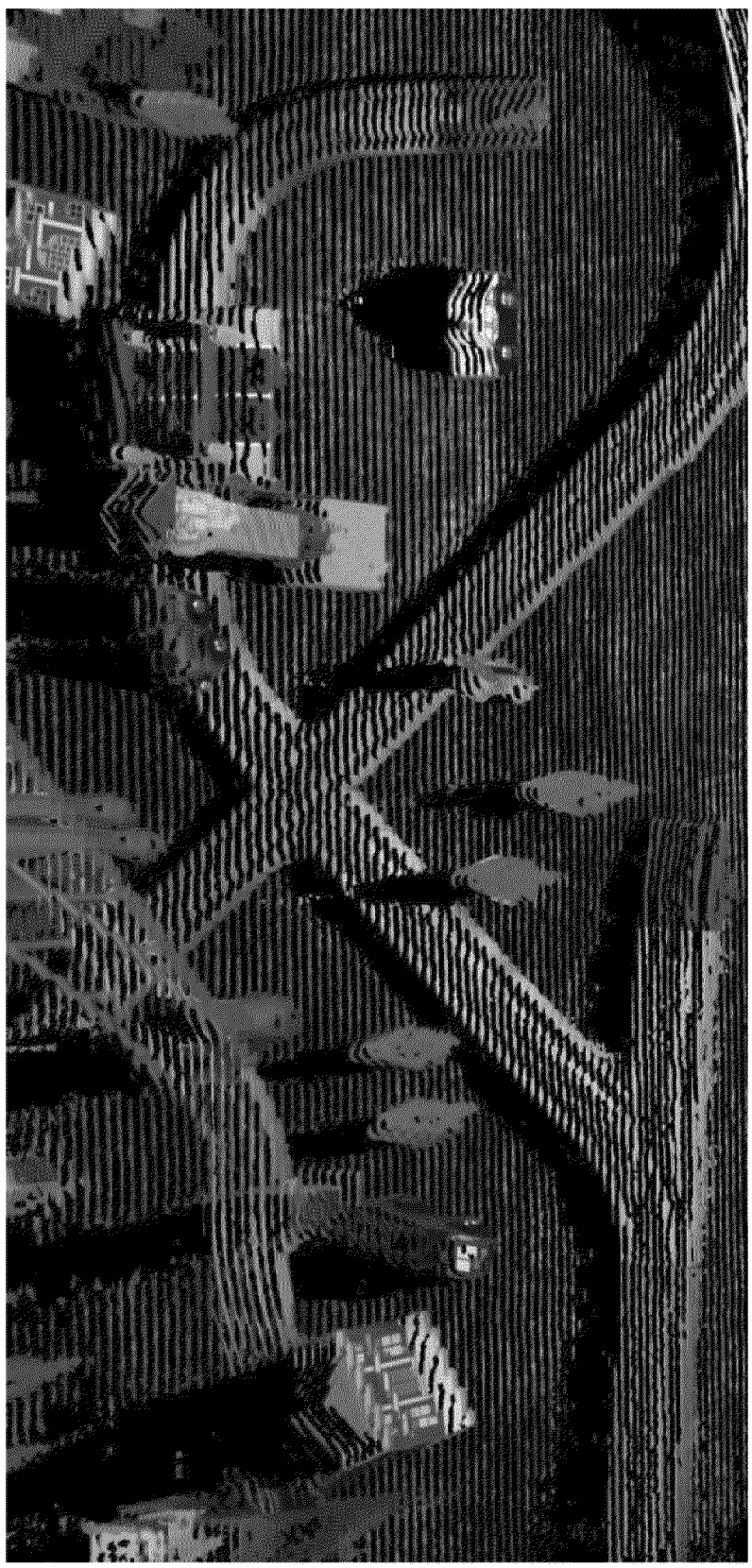
FIG. 2 is an illustration of a virtual image observed with a projective camera located far from one or more real cameras according to one embodiment.

FIG. 2 is an illustration of an extrapolation where a projective camera is located very high in relation to the disposition of the real cameras. The main axis of the projective camera is therefore far from the normal of the slices of the MPI. The virtual image provided displays certain dark regions that could not be observed by real cameras. In this example, the view synthesis from a tiled MPI (or even a full MPI) make slices (or planes) visible when the MPI is projected according to a projection camera which does not lie in the boundaries of the real cameras. This is relatively common when a user can interact freely with a device to define the physical position of the projective camera (as for instance the so-called dynamic window demo, or synthetic views observed with a head-mounted display).

In one embodiment as will be presently discussed, additional data is to be added to each tile in order to orient the tiles such as to decrease the space visible between the tiles when MPI is observed from an extrapolated position. Each slice of the MPI thus no longer restricts its associated content to a flat plane, but rather may be thought of as a collection of oriented (or tilted) tiles which may extend outside the plane according to the orientation of each tile.

Such a representation may permit a faster processing at the rendering side allowing real-time immersion.

Traditionally, the quality of the synthetic views from the MPI, depends on the number of slices. In a tiled version of the MPI, the amount of data is reduced but the quality of the synthetic views still depends on the initial number of slices. In one embodiment, it is possible to add information related to orientation to each of the tiles in order to reduce (globally) the number of slices for a given expected view synthesis quality. In this embodiment having these oriented tiles, it is not necessary to split the object space in many slices (e.g. oriented tiles may allow for an MPI with fewer slices to produce the same view synthesis/rendering quality as an MPI with more slices but which lacks the oriented tile information). If the original MPI content has 500 slices for instance, 100 slices of this may be sufficient to obtain the needed information from these oriented tiles. Through this information, the orientation of the tiles can be determined, and depth accuracy can be maintained. The reduction of tiles also allows for a reduction of total amount of data to be stored.

In one embodiment, the orientation of each tile can be managed in following manner:
- Computing an average depth Z per slice when computing the consensus
- Computing the MPI and determine per tile the z coordinates of the 4 corners of the tile in the object space. These coordinates are saved into an expanded atlas index as will be later discussed. (An additional description name $A_Z$ is maintained that is very limited in required memory size compared to the main atlas containing the texture associated to each tile.)

In another embodiment a view synthesis algorithm can be used which allows the computation of a specific volumetric data. From the acquisition of the raw images given the matrix of cameras, to the computation of the synthetic image as seen from a virtual camera position, several steps are performed.

Figure 3:
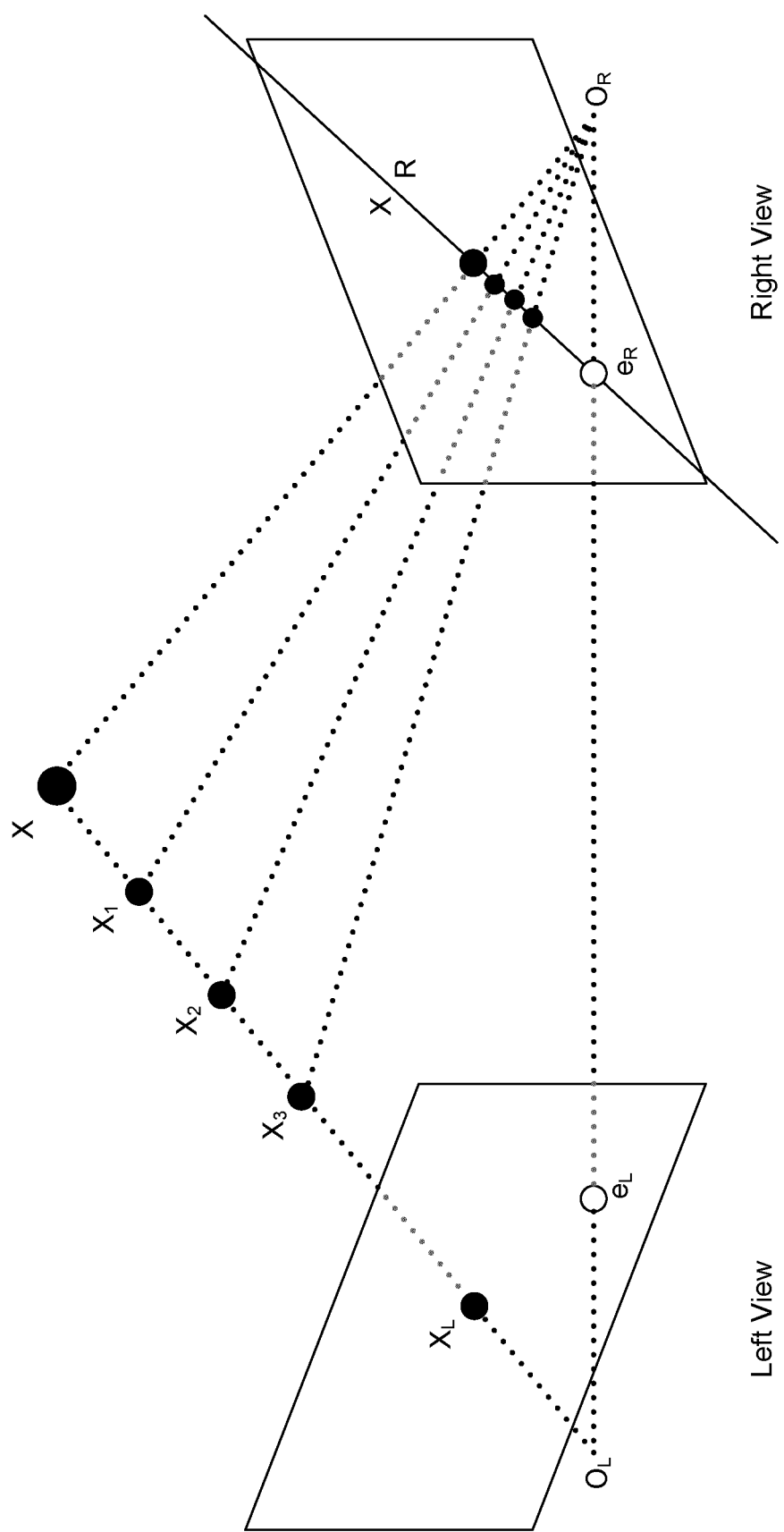
FIG. 3 is an illustration of an Epipolar line.

FIG. 3 is an illustration of an Epipolar line. One important concept associated with camera calibration has to do with geometrical camera calibration. In a scenario where there are N cameras. Depth estimation is made possible between images observed simultaneously from 2 cameras. Let $x_L(x,y)$ be the pixel from the left camera which observes the object in space $X(X,Y,Z)$. $O_L$ is the optical centre of the left camera. Any object $X_i$ which lies on the line $(O_L,X)$ is observed by the same pixel $x_L$. On the right camera, object $X_i$ is observed at coordinates $x_r$ which all lie on one line on the sensor, which is defined as the epipolar line.

The following examples and explanations will help with an understanding of the estimation of depth-maps. For illustration, two cameras will be used in the following explanation but other numbers of cameras can be used in alternate embodiments, as can be appreciated by those skilled in the art.

In one embodiment a method to estimate the depth associated to a pixel is made using the epipolar line as follows:
1) Consider a pixel $p_{ref}(x,y)$ of the reference camera at pixel coordinate (x,y).
2) The pixel $p_{ref}$ is de-projected into the world coordinate system at various distance candidates $Z_c$ with the rotation and translation matrix associated with the reference camera. This will allow the physical position of the coordinates candidates $P_{ref}(X_c,Y_c,Z_c)$ to be obtained, which are all observed by the pixel $p_{ref}(x,y)$. The number of candidates S is typically equal to 100 for a good depth estimation. S may also be referred to as the number of slices, since they define many planes which cut the 3D spaces in parallel slices where depth-map is estimated.
3) The candidates $P_{ref}$ are then projected into the second camera according to the extrinsic and intrinsic camera parameters. One deduces S coordinates $p_{sec}(x_{z_c},y_{z_c})$ on the second camera which all depends on the distance candidate $Z_c$.
4) The distance $Z_{P_{ref}}$ of the real physical object $P_{ref}$ observed at pixel $p_{ref}$ on the reference camera is equal to the distance candidate $Z_c$ if $p_{ref}(x,y)$ is the most similar to $p_{sec}(x_{z_c},y_{z_c})$.

In different embodiments, similarities are computed using various estimators. For ease of understanding two common similarity estimators will be listed, however, as known to those skilled in the art other estimators can be used in alternate embodiments.

The first estimator has to do with L1 norm between 2 pixels—Let pixel p being observed to be color pixels defined by the 3 scalars corresponding to the 3 color components Red, Green and Blue ($p_R, p_G, p_B$). The L1 norm between 2 pixels $p_{ref}(x,y)$ and $p_{sec}(x_{z_c}, y_{z_c})$ is defined by $s_{L1}(p_{ref}(x,y), p_{sec}(x_{z_c}, y_{z_c})) = |p_{ref,R}(x,y) - p_{sec,R}(x_{z_c}, y_{z_c})| + |p_{ref,G}(x,y) - p_{sec,G}(x_{z_c}, y_{z_c})| + |p_{ref,G}(x,y) - p_{sec,G}(x_{z_c}, y_{z_c})|$. From the N candidates $p_{sec}(x_{z_c}, y_{z_c})$, the one having the smallest L1 norm with $p_{ref}(x,y)$ is said to observe to the same object in space. The corresponding $Z_c$ is the depth estimation associated to pixel $p_{ref}$.

The second estimator has to do with Squared L2 norm between 2 pixels—This is similar to the L1 norm previously described, except that the similarity measure for the squared L2 norm is defined by $s_{L2}(p_{ref}, p_{sec}) = \sqrt{|p_{ref,R} - p_{sec,R}|^2 + |p_{ref,G} - p_{sec,G}|^2 + |p_{ref,G} - p_{sec,G}|^2}$ Under one scenario, if the similarity is estimated only with the color component of one pixel, the depth estimation is very sensitive to noise. To overcome this limitation the similarity between 2 pixels is computed using a patch which includes a few surrounding pixels. This technique refers to cross-patch depth-estimation. Obviously, it requires much more computation since it requires $P^2$ more computation for a patch of P×P pixels compared to similarity between 2 pixels. This is a critical point for real-time estimation and especially when embedded into mobile devices. The similarity operator describes above can be used for patches surrounding a pixel:

L1 norm between 2 patches—Let $P_{ref,T}(x,y)$ being a P by P pixels patch surrounding the pixel $p_{ref}(x,y)$ and respectively for patch $P_{sec,T}(x_{z_c}, y_{z_c})$ surrounding pixel $p_{sec}(x_{z_c}, y_{z_c})$. The L1 norm between the 2 patches is defined by $s_{L1}(P_{ref,T}, P_{sec,T}) = \sum_{k=-P/2}^{k=P/2} \sum_{l=-P/2}^{l=P/2} s_{L1}(p_{ref}(x,y), p_{sec}(x_{z_c} - k, y_{z_c} - l))$. From the S candidates $p_{sec}(x_{z_c}, y_{z_c})$, the one having the smallest L1 norm with $p_{ref}(x,y)$ is said to observe the same object in space. The corresponding $Z_c$ is the depth estimation associated to pixel $p_{ref}(x,y)$.

In one embodiment, the depth map is computed between a reference camera and another camera. In case of the matrix made of N cameras, for a given camera, N−1 depth-map is estimated. These depth-maps can be merged into a single one (by averaging, taking the closest data . . . ) in order to estimate one depth-map per camera. At the end of this procedure, N images obtained by the N cameras are associated with N depth-maps. This data is called Multi-View plus Depth (MVD).

In one embodiment, the acquiring of a View Synthesis denotes the computation of an image from a virtual camera which is located close to the matrix of cameras from which the MVD has been observed/computed. The view synthesis algorithm can in one example be provided through the following steps:

1. Consensus cube—With this step, a cube per input image is computed. It quantifies for many sampled depths, how well all the depth-maps match from the viewing point of the selected input camera.
2. Soft Visibility cube—This cube is computed by integrating the consensus cube. The soft visibility cube quantifies, for a camera viewing point, how much an object is visible from a given pixel. The visibility is said to be "soft" because the depth-map estimations are error prone. As for the consensus cube, the soft visibility is comparable to a probability.
3. Virtual Colorcube estimation—Knowing the consensus and visibility cubes of the input images, a virtual colorcube (the MPI) is estimated from a virtual camera.
4. Virtual image computation from the virtual Colorcube—The virtual colorcube (the MPI) is stacked to form a single virtual image.

The above steps will be expanded with additional details in the description to follow. Note that the first three steps of the above step list provide one way to generate an MPI representation of the 3D scene. The resulting MPI is denoted as 'virtual colorcube' in the above step list. The fourth step describes how the MPI representation is used to efficiently generate or synthesize a new view of the 3D scene. As noted previously, there are many known techniques for generating the MPI representation, and steps 1, 2 and 3 of the above list are provided as a concrete illustration. However, the current invention is not limited to the MPI generation technique characterized by steps 1, 2 and 3 above. Rather the current invention may utilize any known technique for generating the MPI representation of the 3D scene. For example, various deep learning approaches for generating the MPI could be employed to generate the MPI representation.

Figure 4:
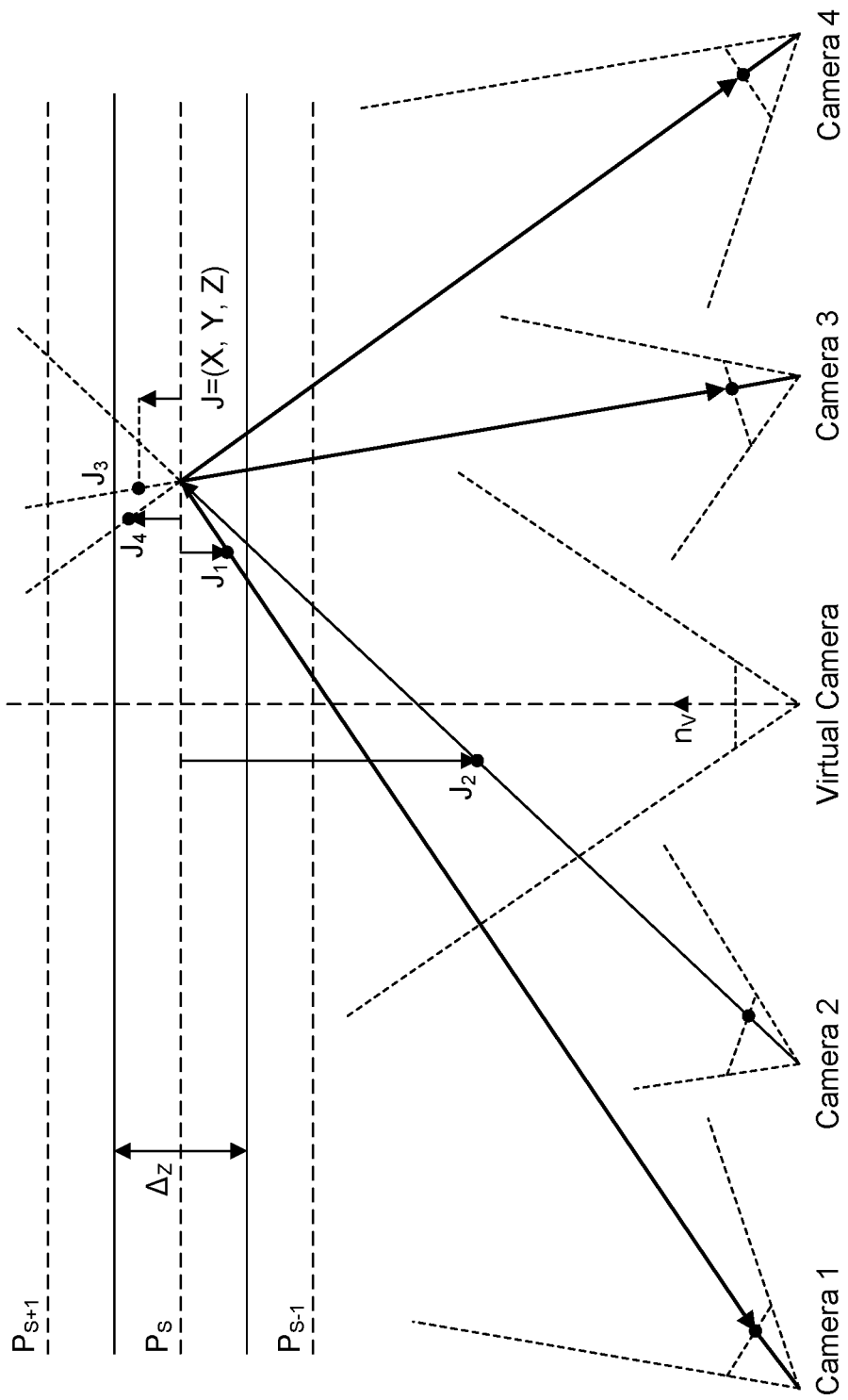
FIG. 4 is an illustration of an example with 4 real cameras, and one virtual camera provided to produce slices of an MPI according to one embodiment.

FIG. 4 is an illustration according to one embodiment. In FIG. 4, multiple slices are shown. At least one slice is defined from a virtual camera (and consensus computation for a camera 2). In one embodiment, the consensus denotes how closely the values of the depth-maps are in agreement with at least one given depth-map. For each input image $I_i$ made of $(N_x, N_y)$ pixels and its corresponding depth-map $D_i$, a consensus cube $C_i$ is computed. The cube $C_i$ is made of $(N_x, N_y, S)$ pixels where S denotes the number of slices. The slices are defined according to the virtual camera for which the MPI is computed. The virtual camera is typically located at the middle of the real cameras, however other positions of the virtual camera are also possible.

Referring back to FIG. 4, the results for 4 real cameras and one virtual camera are provided. Each of these defines the slices of the MPI generated for this example. The slices $P_s$ are perpendicular to the main optical axis of the virtual camera and distant by z from the virtual camera (according to equation (1)). The slices $P_s$ are used for all real cameras whatever are their orientations to compute their consensus. Sharing the same slices among the real cameras and the virtual camera makes computation easier and faster and is necessary for the proposed algorithm. Each slice $s \in [1, S]$ is associated with a distance z which varies inversely proportional from $z_{min}$ and $z_{max}$ as given by equation (1). $z_{min}$ and $z_{max}$ characterise the position, in the virtual camera system, of the first and last slices of the MPI. The minimum and maximum distances are defined depending on the scene content, it is typically set to the same minimum and maximum distances used to compute the depth-maps.

$$z(s) = \frac{1}{\frac{s\left(\frac{1}{z_{min}} - \frac{1}{z_{max}}\right)}{S} + \frac{1}{z_{min}}} \quad (1)$$

To compute the consensus of camera i, a ray is cast from that camera and passes through a pixel (x,y) (i=2 in FIG. 4). This ray hits the Slice $P_s$ at the WCS coordinate J=(X,Y,Z). This coordinate is projected back into the real cameras k at pixel coordinates $(x_k', y_k')$. The depth maps give $z_k' = D_k(x_k', y_k')$ the depth estimated at that coordinate. The points $(x_k', y_k', z_k')$ are expressed in the VII camera coordinate system, they correspond to point $J_k$ which are then expressed in the WCS. The thickness of a slice is $\Delta_z = z_M - z_m$ with $z_M = z(s+\frac{1}{2})$, and $z_m = z(z-\frac{1}{2})$. To define the consensus cube, the pulse function $\Pi(a,b,c)$ is defined such that:

$$\prod(a,b,c) = \begin{cases} 0 & \text{if } a < b \\ 1 & \text{if } b < a < c \\ 0 & \text{if } a > c \end{cases} \quad (2)$$

Also the Heaviside $H(a,b)$ function is defined as follows:

$$H(a,b) = \begin{cases} 0 & \text{if } a < b \\ 1 & \text{else} \end{cases} \quad (3)$$

The value of the consensus at pixel $(x,y)$ for the camera i at the slice s is equal to:

$$C_i(x, y, z(s)) = \frac{\sum_{k \in M} \prod(d_a(J_k, P_s), z_m, z_M)}{\sum_{k \in M} H(d_a(J_k, P_s), z_m)} \quad (4)$$

Where M is the set of cameras which are used to compute the consensus of camera i. For a precise computation M is chosen equal to all cameras. $d_a(C_v, J_k)$ is the algebraic measure between the virtual camera $C_v$ and point $J_k$. $d_a(J_k, P_s)$ is the algebraic measure between point $J_k$ and the plane $P_s$. These distances are computed using $Q_v$ the intrinsic matrix of the virtual camera:

$$d_a(C_v, J_k) = [0\ 0\ 1] \cdot Q_v \cdot [J_k 1]^T$$

$$d_a(J_k, P_s) = [0\ 0\ 1] \cdot Q_v \cdot [J_k 1]^T - z(s) \quad (5)$$

$\Delta_z$ is the thickness of a slice with $\Delta_z = z(s+\frac{1}{2}) - z(s-\frac{1}{2})$. Projection and de-projection are computed with the intrinsic and extrinsic camera parameters. The consensus is defined as the ratio between the numbers of depth-maps (e.g. the number of cameras) which agree that an object is within a slice divided by the total number of depth-maps (e.g. the total number of cameras) which can still see this slice and beyond. $d_a(J_k, P_s)$ are illustrated in FIG. 4 with blue arrows.

The computation of the consensus $C_i$ is noisy especially when most of the images are occluded beyond a certain distance. In this case, the denominator of equation (4) tends to zero. One option is to set a minimum value for the denominator. This minimum value is experimentally set to M/4. The consensus $C_i$ at slice s can be smoothed in order to improve its signal to noise. Denoising is performed slice per slice by so-called guided denoising algorithms. A local smoothing kernel is computed with surrounding pixels around $C_i(x,y,s)$ from the consensus at slice s and around pixels from the observed image $I_i(x,y)$.

Soft Visibility is computed for a given image $I_i$ by integrating its consensus $C_i$ through slices according to the following equation:

$$SofVis_i(x, y, z(s)) = \max\left(0, 1 - \sum_{s'=1}^{s'=s} C_i(x, y, z(s'))\right) \quad (6)$$

The visibility is equal to 1 for the first slice and decreases until 0. When the visibility is decreasing toward 0, this means that beyond a given slice, the image $I_i$ is occluded by an object visible at pixel $I_i(x,y)$. The max( ) in equation (6) prevents the visibility to decrease bellow 0. This occurs frequently because the consensus is the agreement between all cameras which can see beyond occluded objects from the view i. Potentially the $\Sigma_{s'=1}^{s'=s} C_i(x,y,z(s'))$ can be equal to M the number of cameras used to compute $C_i$.

Figure 5:
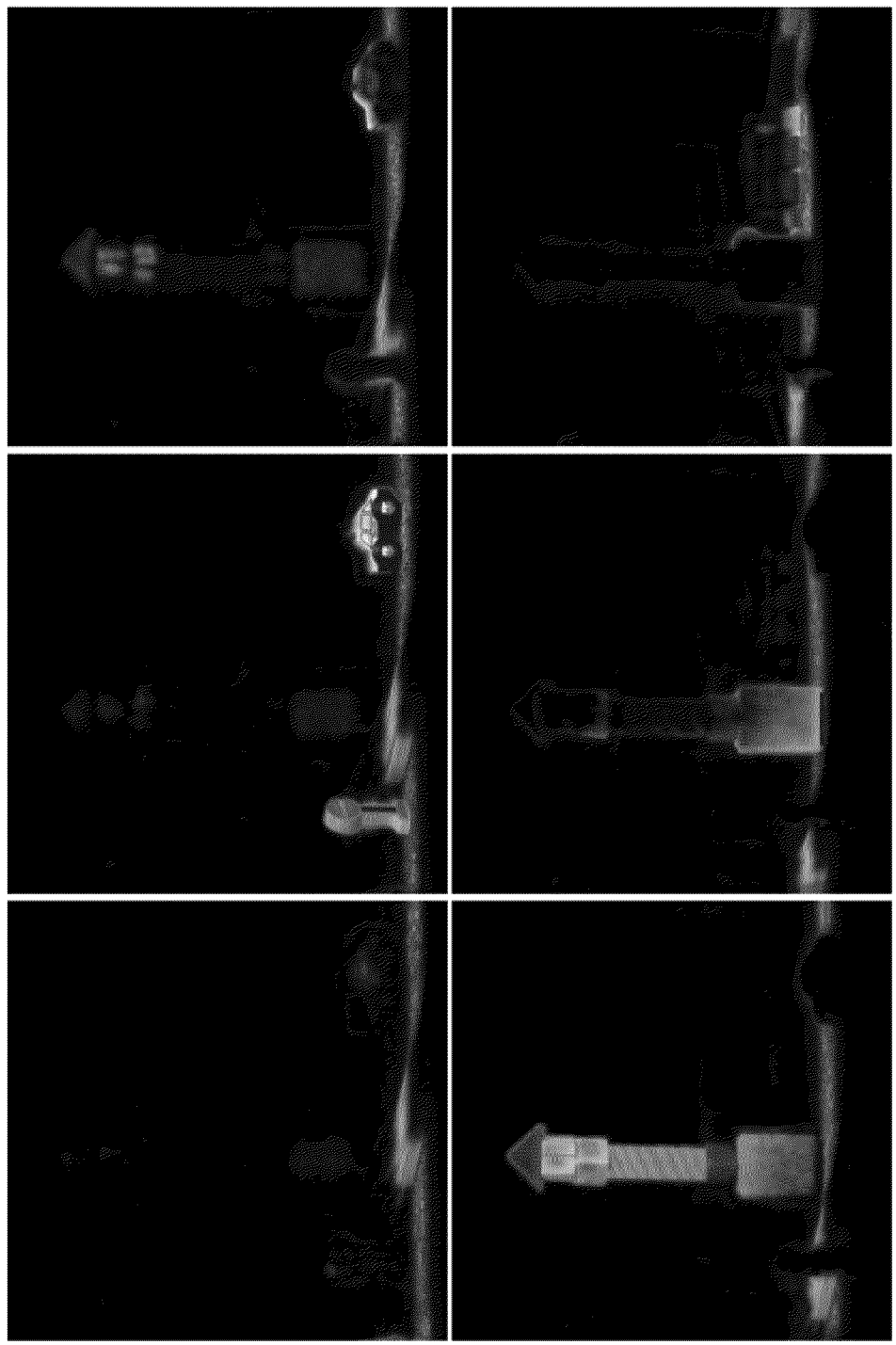
FIG. 5 is an illustration of six consecutive slices forming of a virtual color cube according to one embodiment.

FIG. 5 provides an illustration of six (6) consecutive slices of a virtual color cube. The top left image provides a foreground slice and the bottom right image provides a background slice and the other slices fall in between. In one embodiment, FIG. 5 can be used in the estimation of a virtual image seen from a virtual camera position computed with a set of M' observed images $I_k$ such that $k \in M'$. The set M' can be defined simply as the 4 real cameras closest to the virtual camera, or all cameras to build a complete MPI where the maximum set of objects are visible.

To estimate a virtual image seen from a virtual camera position, a virtual colorcube also called MPI $Color_{synth}(x,y,z(s))$ is computed as a preliminary step. The colorcube is in the coordinate system of the virtual camera which is characterized with intrinsic and extrinsic camera parameters. Each slice of this virtual cube is computed as an average of the M' images weighted by the corresponding soft visibility.

$$Color_{synth}(x, y, z(s)) = \frac{\sum_{k \in M'} Soft\ Vis_k(x'_k, y'_k, z'_k) I_k(x'_k, y'_k)}{\sum_{k \in M'} Soft\ Vis_k(x'_k, y'_k, z'_k)} \quad (7)$$

In (7), $(x_k', y_k', z_k')$ denotes the re-projected coordinate $(x,y,z(s))$ from the virtual camera to the real camera k. The great advantage of this approach is that the integer coordinates $(x,y,z(s))$ from the virtual color cube are computed with a backward warping approach which is made possible thanks to the sampling of $z(s)$ by the cube. The virtual color cube is like a focal stack where only objects lying at the given slice are visible, the foreground objects have been removed.

In one embodiment, a virtual color cube can also be created. In this embodiment, the MPI is merged to form a unique virtual colorimage. In this embodiment, it may be helpful to first compute the consensus cube $Consensus_{synth}(x,y,z(s))$ and the visibility cube $SoftVis_{synth}(x,y,z(s))$ associated with the color virtual images. Similarly to equation (7) the computation is done by averaging the M' initial consensus or visibility cube:

$$Consensus_{synth}(x, y, z(s)) = \sum_{k \in M'} C_k(x'_k, y'_k, z'_k) \quad (8)$$

$$Soft\ Vis_{synth}(x, y, z(s)) = \sum_{k \in M'} Soft\ Vis_k(x'_k, y'_k, z'_k) \quad (9)$$

Where $(x,y,z(s))$ is a voxel coordinate of the virtual consensus cube. $Consensus_{synth}(x',y',z')$ is computed by deprojecting voxel $(x,y,z(s))$ into the WCS $(X,Y,Z)$ and then projected into the coordinates $(x_k',y_k',z_k')$ with $z_k'$ being the distance from point $(X,Y,Z)$ to camera $c_k$.

Both cubes defined above are combined into $CC(x,y,z(s))$ $$CC(x,y,z(s)) = \min(Consensus_{synth}(x,y,z(s)), SoftVis_{synth}(x,y,z(s))) \quad (10)$$

The CC is a kind of probability which varies between 0 to 1. The typical values are:
  If a given $CC(x,y,z(s))$ is equal to 1, this means that all cameras agree that an object is lying at the distance z from the virtual camera, and is seen at the coordinate $(x,y)$ within the virtual camera.

A high value CC>50% is rare—it corresponds to an object where the depth estimation was accurate (textured areas) and positioned exactly on a slice of the virtual camera (or cameras) and quite close to the slices of the real cameras.

CC values are mostly equal to 0 since many slices (or many areas of a typical slice) do not match any object.

For objects with few details, the depth-maps extracted from the raw images do not agree and the raw consensus is low, it can be as low as 1/N where N is the number of cameras. In this case the CC is also low with values around 1/N.

CC values can be lower than 1/N for objects which lie between 2 slices. So CC values equal to a few percent (e.g. close to zero) are common.

The color slices are then weighted by consensus and accumulated until ray visibility reaches zero:

$$I_{synth}(x, y) = \frac{\sum_{s=1}^{s=s} \text{Color}_{synth}(x, y, z(s))CC(x, y, z(s))}{\sum_{s=1}^{s=s} CC(x, y, z(s))} \quad (11)$$

In one embodiment, the virtual colorcube (that is, the MPI representation of the 3D scene) is saved with pixels made of 4 values: Red, Green, Blue and α (RGBα). The RGB encodes the colors computed by equation (7). The α encodes the CC(x,y,z(s)) component which has computed with equation (10).

Figure 6:
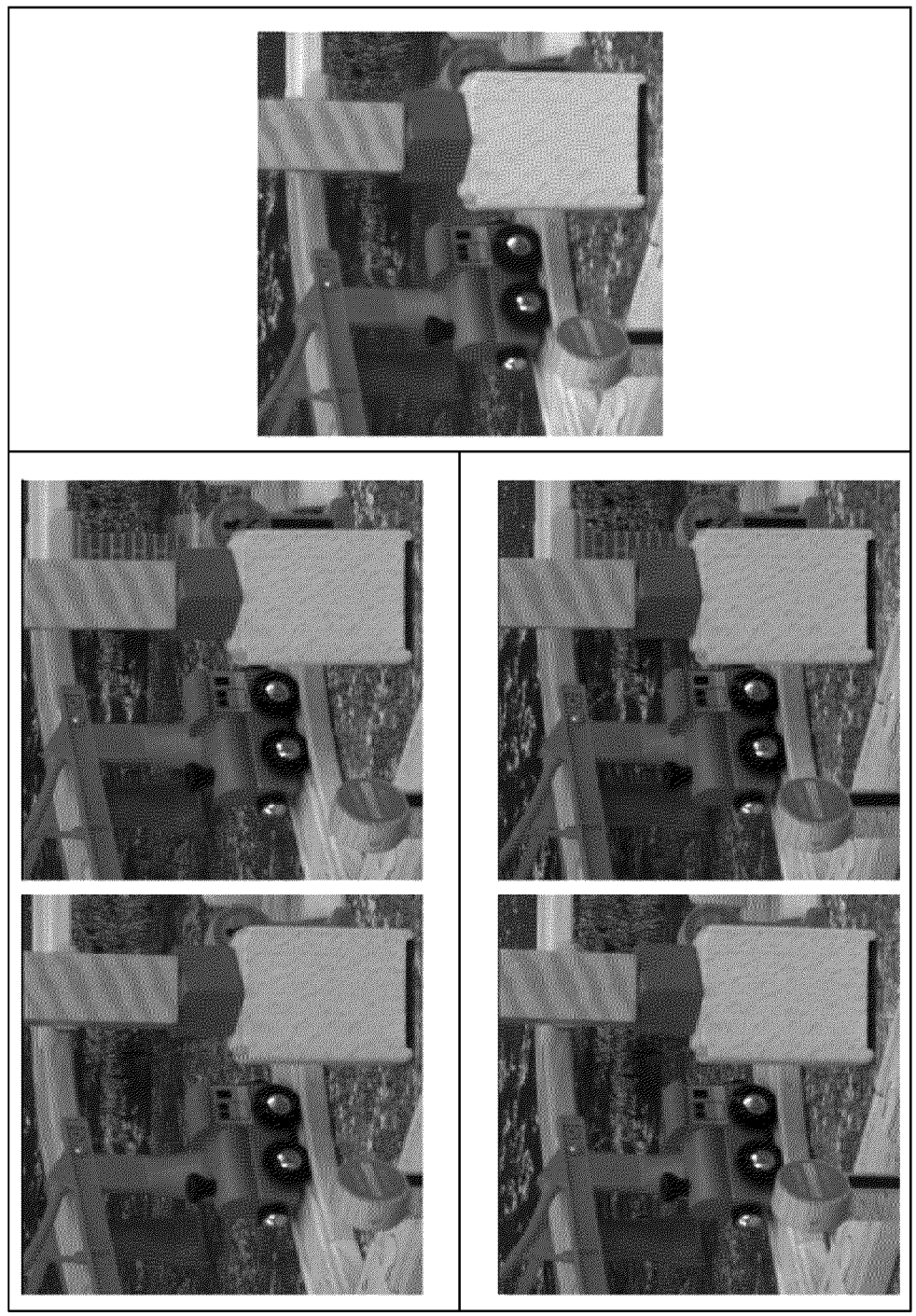
FIG. 6 illustrates the result of an algorithm applied on images captured with a matrix of 4×4 cameras according to one embodiment.

FIG. 6 is an illustration of an embodiment showing the result of the algorithm applied on images captured with a matrix of 4×4 cameras. 4 consensus and visibility cubes are computed with 128 slices for the 4 central cameras. All depth-maps are contributing to compute the consensus and visibility cubes: the set M is made of 16 cameras. The synthetic colorcube is computed with the 4 central cameras: the set M' is made of 4 cameras.

FIG. 6 illustrates a detailed view of the 4 original images (4 images on the left), and the synthetized image (right image). In this example, this algorithm is producing very accurate results even with scenes made of complex occlusions. It requires a large amount of memory for the M' consensus and visibility cubes. In the example, the capture apparatus is comprised of a 4×4 matrix of 2MPixel cameras; 200 slices are used to compute the depth-maps, consensus and visibility cubes. The computation of one synthetic image is performed in 5 seconds on a GPU and requires 8 Gb of memory.

FIGS. 7A and 7B are illustrations showing the merging of virtual color cubes into a single virtual image. FIG. 7A provides a virtual image sharing the same virtual camera position as the virtual color cube. FIG. 7B is a virtual image freely computed from the virtual color cube. The virtual image produced in FIG. 7B is a synthesized view of the 3D scene from a second virtual camera position, where the second virtual camera position generally differs from the original virtual camera position of the virtual color cube.

In the embodiment discussed, as a final step of the view synthesis algorithm, the virtual colorcube is merged into a single virtual image according to some weights. FIGS. 7 A and B as discussed illustrate how the merging is done per 2D coordinates. This allows for a compatible real-time rendering with the computation time dedicated to the computation of the MPI.

Once the MPI is defined for a given virtual camera position, in one embodiment, other virtual views are approximated, and the virtual color cube is provided with perspective projections (FIG. 7B). The second projection controls the viewing-point and camera position of the second virtual camera of the final synthetized image. Accordingly, the two virtual cameras positions are defined, the first virtual camera position is dedicated to compute the virtual colorcube (MPI), and the second virtual camera position is dedicated to merge the virtual colorcube (MPI) into a freely selected virtual camera position. In practice, the first virtual camera position used to compute the MPI is located at the middle of the real cameras, and the second virtual camera position is controlled by the head position or viewing position of a user for an immersive experience.

The equation (12) is modified by the projection of the 3D coordinate (x,y,z) with the 4×4 projection matrix P:

$$I_{synth}(x, y) = \frac{\sum_{s=1}^{s=s} \text{Color}_{synth}(x_p, y_p, z_p)CC(x_p, y_p, z_p)}{\sum_{s=1}^{s=s} CC(x_p, y_p, z_p)} \quad (12)$$

Where $[x_p,y_p,z_p,1]=P\times[x,y,z(s),1]$. The projected coordinate $(x_p,y_p,y_p)$ being non-integer, value $\text{Color}_{synth}(x_p,y_p,z_p)$ are extracted with interpolation. Merging the virtual colorcube with a slanted projection produces a virtual image with slightly lower quality than the complete algorithm computed for the first virtual camera. Nevertheless, this approach permits to split the computation of the 3 first steps of the algorithm, including the computation of the virtual colorcube, from the stacking of that cube into the virtual image. The real-time rendering is therefore possible with recorded content and some precomputation up to the virtual color cube.

Figure 8:
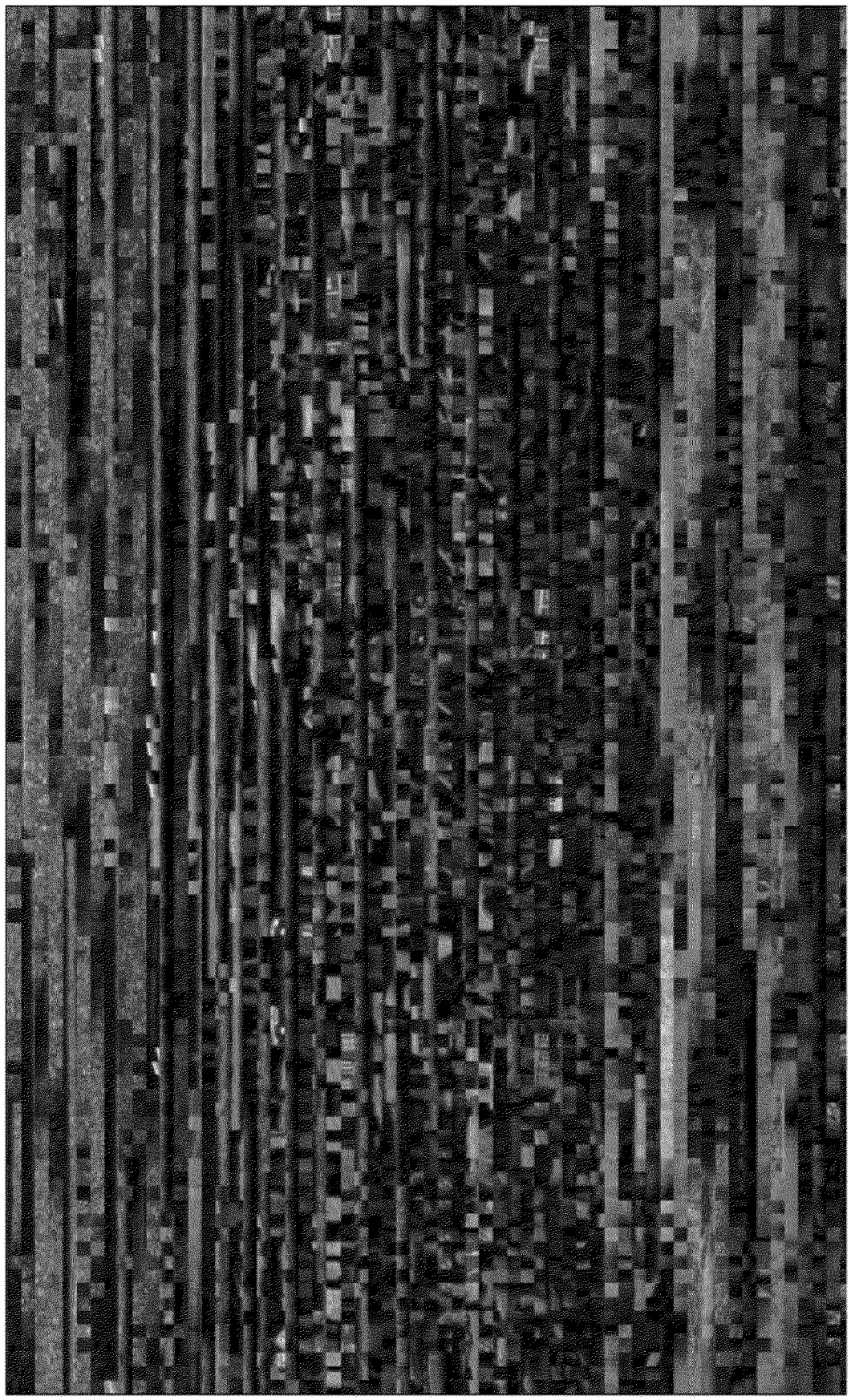
FIG. 8 is an illustration of pixels of a tile saved into a 2D image according to one embodiment.

FIG. 8 is an illustration of the tiling of a virtual color cube. All tiles are saved into a 2D image. The virtual color cube or MPI is by nature large. For instance with a camera rig of 4×4 cameras of 2048×1088 pixel resolution each, the virtual colorcube is typically made of 128×2048×1088 pixels for 128 slices. The virtual colorcube is also full of zeros since most of the areas in the various slices in the MPI do not match with the scene details. With real content one notes that 90% of the pixels are null or with a negligible contribution: CC(x,y,z(s))<10%. Stacking the colorcube as illustrated in FIG. 7 is computed at 4 Hz with recent GPU cards. To speed-up by a factor of 10 the MPI is converted into a new structure with no or few null pixels. A basic approach is to split the MPI into tiles $T_i$ of pixel size $[T_x,T_y]$. This may be a fixed size, for example.

Choosing all tiles with the same size makes the splitting of the virtual colorcube easier. FIG. 8 illustrates how the virtual cube, partially shown in FIG. 5, is converted into a single 2D image where only the significant tiles are saved. Tiles which do not have significant content are discarded and will be treated as empty in subsequent projection operations for view synthesis. For the significant tiles saved to the 2D image, 4 components are saved per pixel, the RGB color component plus the α component which records the CC values as described by equation (10). The collection of significant tiles is arranged in a structure called an Atlas. A tile $T_i$ is characterized by a small image made of $[T_x,T_y]$ pixels and a 3D position within the virtual colorcube $(x_i,y_i,s_i)$ where $s_i$ is the slice from which the tile has been extracted between pixel coordinates $(x_i,y_i)$ and $(x_i+T_x,y_i+T_y)$. The $[T_x,T_y]$ pixels of a tile are saved into a 2D image as shown in FIG. 8.

An Atlas is made of:
1) A 2D image A of size $(n_x T_x \times n_y T_y)$ which records the selected tiles. The maximum number of tiles that A can record is equal to $(n_x \times n_y)$. Each pixel of a tile is defined by 4 components RGBα where α is the CC as defined in equation (10).
2) A 2D image $A_{ind}$ of size $(n_x \times n_y)$ which records the 3D position of the corresponding tiles in A. Each pixel of $A_{ind}$ is made the 3 component values $(x_i, y_i, s_i)$ corresponding to 3D position of the $i^{th}$ tiles described in A.

In order to allow the orientation of each tile, the following operations are done:
1—Compute an average depth Z per slice and per pixel when computing the consensus
2—Computing the MPI and determine per tile the z coordinates of the 4 corners of the tile in the object space. These coordinates are saved into an expanded atlas index.

Equation (4) describes the computation of the consensus cube for a given camera and a given slice. The proposed algorithm defines the average z consensus $CZ_i(x,y,z)$ defined by:

$$CZ_i(x, y, z(s)) = \frac{\sum_{k \in M} d_a(C_v, J_k) \prod (d_a(J_k, P_s), z_m, z_M)}{\max(\prod (d_a(J_k, P_s), z_m, z_M), 1)}$$ (13)

$$CZ_i(x, y, z(s)) = z(s) \text{ if } \prod (d_a(J_k, P_s), z_m, z_M) = 0$$

While the virtual colorcube (MPI) is being computed by projecting the raw images into the virtual slices, it is important to project also the average z consensus $CZ_i(x,y,z)$ into a cube $Z_{synth}(x,y,z(s))$ having the same size as the MPI. This cube keeps track of the average z of the objects which are more accurate than slice thicknesses. $Z_{synth}(x,y,z(s))$ is computed by the following equation:

$$Z_{synth}(x, y, z(s)) = \frac{\sum_{k \in M'} CZ_i(x', y', z') \prod (d_a(CZ_i(x', y', z'), P_s), z_m, z_M)}{\Sigma_{k \in M'} \prod (d_a(CZ_i(x', y', z'), P_s), z_m, z_M)}$$ (14)

As for equation (7), $(x_k', y_k', z_k')$ denotes the re-projected coordinate $(x,y,z(s))$ from the virtual camera to the real camera k.

$d_a(C_v, J_k)$ is the distance between the virtual camera $C_v$ and point $P_k$. This distance contributes to $CZ_i(x,y,z(s))$ if point $J_k$ belongs to slice s. $CZ_i(x,y,s)$ represents the average distance to the virtual camera of points $J_k$ that belong to slice s. This average distance is very accurate for depth-maps computed on textured areas, for these areas, the thickness of the slice is too large compared to the accuracy of the depth-maps. The $CZ_i(x,y,s)$ permits to keep trace of this accuracy. On textureless areas the point $J_k$ are spread in several slices.

Figure 9:
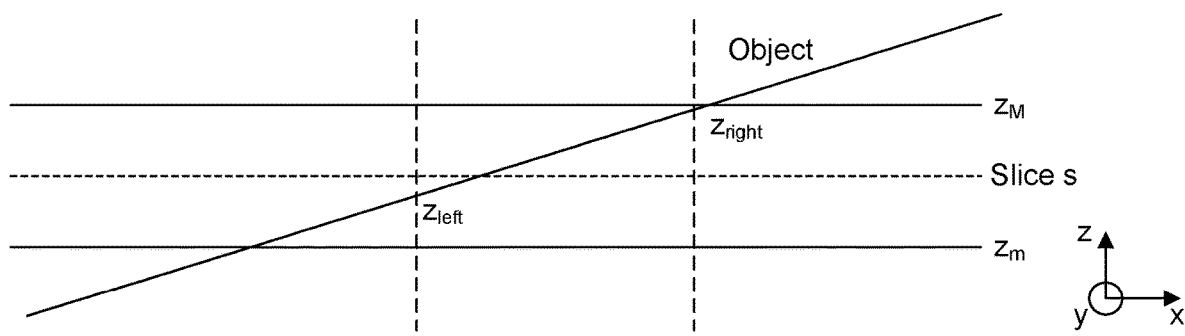
FIG. 9 is an illustration of a one dimensional tile orientation according to one embodiment.
Figure 10:
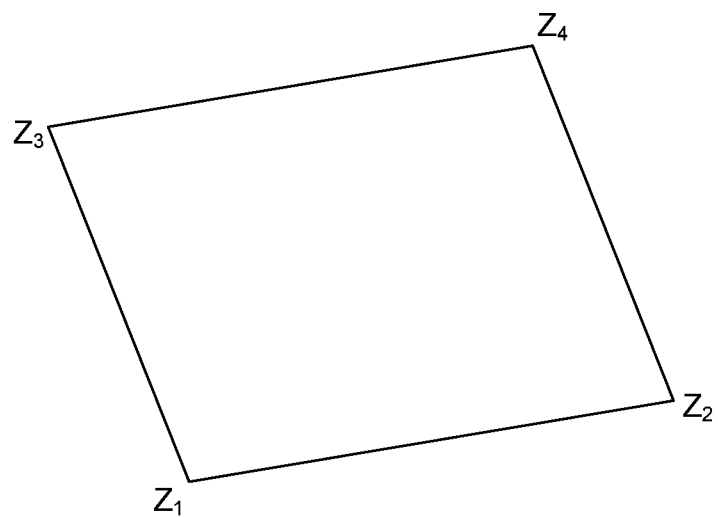
FIG. 10 is an illustration of a 2D tile orientation according to one embodiment.

FIG. 9 is an illustration of a top view for a schematic tile extraction showing how a tile is oriented in one dimension. The figure is illustrative, since in practice the tile orientations are based on the content of the tile, and so are not limited to a single dimension. FIG. 10 provides the four corners of a tile. While a tile is extracted from the MPI, the orientation can be computed with the $Z_{synth}(x,y,z(s))$ of the pixels belonging to that tile. From FIG. 9, knowing $z_{left}$ and $z_{right}$ and their orientation is sufficient to characterize the orientation of the tile and further characterize it as in FIG. 10 by the 4 depths $Z_1, Z_2, Z_3, Z_4$ of the 4 tile corners.

In this way, the MPI is computed, and the cube $Z_{synth}(x, y, z(s))$ defines for each pixel in the MPI the distance to the camera with an accuracy greater than the corresponding slice thickness. The MPI is converted into tiled MPI in order to save spaces. Tiles are extracted from the MPI, and the tiles are oriented by using $Z_{synth}(x,y,z(s))$.

To compute the four corners of the tiles, first the average distance of the tile is computed. $(x_t, y_t)$ is the left bottom pixel coordinate of the tile of size $(T_x, T_y)$:

$$Z_{center} = \frac{\sum_{i=0}^{i=T_x-1} \sum_{j=0}^{j=T_y-1} Z_{synth}(x_t + i, y_t + j, z(s))}{T_x T_y}$$ (15)

The slopes of the z is estimated with the x and y derivative of $Z_{synth}$:

$$Z_{slope\,x} = \frac{\sum_{i=0}^{i=T_x-1} \sum_{j=0}^{j=T_y-1} Z_{synth}(x_t + i + 1, y_t + j, z(s)) - Z_{synth}(x_t + i, y_t + j, z(s))}{T_x T_y}$$ (16)

$$Z_{slope\,Y} = \frac{\sum_{i=0}^{i=T_x-1} \sum_{j=0}^{j=T_y-1} Z_{synth}(x_t + i, y_t + j + 1, z(s)) - Z_{synth}(x_t + i, y_t + j, z(s))}{T_x T_y}$$ (17)

From the previous equation, one derives the 4 distances of the 4 corners of the tile t.

$$Z_1 = Z_{center} - \frac{z_{slope\,X} T_x}{2} - \frac{Z_{slope\,Y} T_y}{2}$$
$$Z_2 = Z_{center} + \frac{z_{slope\,X} T_x}{2} - \frac{Z_{slope\,Y} T_y}{2}$$
$$Z_3 = Z_{center} - \frac{z_{slope\,X} T_x}{2} + \frac{Z_{slope\,Y} T_y}{2}$$
$$Z_4 = Z_{center} + \frac{z_{slope\,X} T_x}{2} + \frac{Z_{slope\,Y} T_y}{2}$$ (18)

The Atlas is extended to comprise the orientation information for the tiles. An atlas is made of nx*ny tiles each tile having the size Tx*Ty. Each pixel of a tile is defined by 4 components RGBα where α is the CC as defined in equation (10). In the general case, each tile has a (x,y,z) coordinate corresponding to its location in the scene. The oriented tile will have another set of 4 coordinates corresponding to the depth of the 4 corners (Z1, Z2, Z3, Z4)

In one embodiment, an example can be provided where the extended Atlas is made of:
1) A 2D image A of size $(n_x T_x \times n_y T_y)$ which records the selected tiles. See FIG. 8 for an example. The maximum number of tiles that A can record is equal to $(n_x \times n_y)$. Each pixel of a tile is defined by 4 components RGBα where α is the CC as defined in equation (10).
2) A 2D image $A_{ind}$ of size $(n_x \times n_y)$ which records the 3D position of the corresponding tiles in A. Each pixel of $A_{ind}$ is made the 3 component values $(x_i, y_i, s_i)$ corresponding to 3D position of the $i^{th}$ tiles described in A.
3) A 2D image $A_Z$ of size $(n_x \times n_y)$ which records the orientation information for the tiles. For example, if the orientation information is expressed as the four corners of the tile, then each element of the 2D image $A_Z$ records the 4D z distances of the 4 corners of the corresponding tile in A.

The atlas (e.g. the extended atlas comprising the tile orientation information) is used to reconstruct a stacked tile representation comprising the oriented tiles, and this is projected into a 2D image according to the projection matrix P. The atlas image $A_z$ gives the 4 distances z of the tile corners.

$$I_{synth}(x, y) = \frac{\sum_{s=1}^{s=S} \text{Color}_{synth}(x_p, y_p, z_p) CC(x_p, y_p, z_p)}{\sum_{s=1}^{s=S} CC(x_p, y_p, z_p)} \quad (19)$$

Where $[x_p, y_p, z_p, 1]=P\times[x_t+i, y_t+j, z_t(i,j), 1]$ with $z_t(i,j)=Z_1+i(Z_2-Z_1)+j(Z_3-Z_1)$. A graphics API such as OpenGL is commonly used for real-time projection of the MPIs. With OpenGL, it is sufficient to give the coordinates of 2 triangles to plot a tile. In the virtual camera system, the first triangle will have the following coordinates: $[(x_t, y_t, Z_1), (x_t, y_t+T_y, Z_3), (x_t+T_x, y_t, Z_2)]$. The second triangle has the following coordinates: $[(x_t, y_t+T_y, Z_3), (x_t+T_x, y_t, Z_2)], (x_t+T_x, y_t+T_y, Z_4)]$. The 2 triangles are associated to the textures (e.g. RGB values) given by the $[T_x, T_y]$ pixels recorded for the tile in the atlas. OpenGL is performing the projection of the 2 triangles, and the rasterization according the projection matrix P. The size of $A_Z$ is negligible compared to the size of the atlas image A which stores the tile textures. Also the computation time taking into consideration the z distances of the tile corners has no impact compared to projecting the tiles at a given $z(s_t)$.

In an alternate embodiment, the atlas (e.g. extended atlas comprising the tile orientation information) may be stored. The atlas may be saved to a file, or written to a bitstream. The file or bitstream may be stored for later use, or it may be conveyed over a network to another device so that the other device may use the atlas information to render views of the 3D scene (e.g. in real time). At the decoder side the atlas information is decoded and RGBα of each pixel, $(x_t, y_t, z_t)$ and 4 depth values (Z1, Z2, Z3, Z4) of each tile are decoded. These $(x_t, y_t, z_t)$ and the 4 depths are used to recalculate the coordinates of each pixel for each tile $[x_p, y_p, z_p, 1]$. The coordinates of a given pixel belonging to a given tile is performed using the projection matrix P and the z coordinate calculated from the depth values of 4 corners following the equation:

$[x_p, y_p, z_p, 1]=P\times[x_t+i, y_t+j, z_t(i,j), 1]$ with $z_t(i,j)=Z_1+i(Z_2-Z_1)+j(Z_3-Z_1)$ OpenGL may be used by the decoder device to achieve real-time projection of the MPIs. With OpenGL, it is sufficient to give the coordinates of 2 triangles to plot a tile. In the virtual camera system, the first triangle will have the following coordinate: $[(x_t, y_t, Z_1), (x_t, y_t+T_y, Z_3), (x_t+T_x, y_t, Z_2)]$. The second triangle has the following coordinates: $[(x_t, y_t+T_y, Z_3), (x_t+T_x, y_t, Z_2)], (x_t+T_x, y_t+T_y, Z_4)]$. The 2 triangles are associated to the textures (RGB) given by the $[T_x, T_y]$ pixels recorded in the atlas. OpenGL is performing the projection of the 2 triangles, and the rasterization according to the projection matrix P. Each pixel is synthetized following the equation:

$$I_{synth}(x, y) = \frac{\sum_{s=1}^{s=S} RGB(x_p, y_p, z_p)\alpha(x_p, y_p, z_p)}{\sum_{s=1}^{s=S} \alpha(x_p, y_p, z_p)}$$

Computing an MPI with many slices has in the past been a necessity in order to have accurate synthetized views (both from virtual camera positions between the real cameras, and also from extrapolated positions). But having many slices produces many significant tiles, and thus the tiled MPI becomes larger. In one example, with a given scene, for an MPI with 500 slices, 280000 tiles can be extracted requiring 55 Mbytes of data. Using oriented tiles, in one embodiment, this can be achieved with comparable rendering performance with a reduced number of slices (e.g. 100 slices instead of 500). With only 100 slices, the number of extracted tiles is reduced to 130000 which reduces the size to 26 Mbytes of data. The additional cost to encode the oriented tiles is equal to 8% of the extracted tiles, therefore the tile orientation information incurs an additional cost of 2 Mbyte which is small in regards to the total size, and much smaller than the total size in case of 500 slices. In one embodiment, simulations illustrate that an MPI does not need to have too many slices if tiles are oriented accordingly. Having less slices permits to reduce the size of the tiled MPI despite the additional encoding cost of the orientation of the tiles.

As discussed in one of the previous embodiments, when the tile orientations can be characterized with the 4 corner depth values $Z_1$, $Z_2$, $Z_3$ and $Z_4$ recorded into the 2D image $A_Z$, the values can be computed by the slopes estimated on the pixels belonging to that tile as given by equations (16) and (17). In another embodiment, the image $A_Z$ could be defined slightly differently by keeping only 3 components as for instance $Z_{center}$, $Z_{slopeX}$ and $Z_{slopeY}$, representing respectively the depth of a center point of the tile, the slope of depth with respect to the x dimension, and the slope of depth with respect to the y direction. The essence of $A_z$ is to model the variation of average z consensus $CZ_i(x,y,z)$ for the pixels belonging to the extracted tile for a given slice. In one embodiment, a linear model (e.g. corresponding to a flat oriented tile) may be used with orientations characterized with slopes. For this model, there are many different ways that the spatial position and orientation of such tiles may be specified. For example, depth values could be specified for four corners of the tile, depth values could be specified for three corners of the tile, or depth values could be specified for a center point of the tile as well as two of the tile's corners. Depth values could be provided for points located at the center of one or more of the edge boundaries of the tiles. Alternately a single depth value may be provided, along with horizontal and vertical slope parameters to define the tile orientation. Instead of slope parameters, two component angular values may be used to specify the orientation. Such angular values may indicate the angle at which the tile is oriented relative to the slice plane, for example in the horizontal and vertical directions. Alternately the angular values may indicate the angle of a surface normal of the tile relative to the slice plane. In one embodiment, any parameters may be utilized which specify a position (e.g. depth) and an orientation for the tiles. Moreover, such parameters may be stored in an atlas image $A_z$ as previously specified, however other techniques for storing and providing access to the tile orientation parameters are also possible. Moreover, models other than the linear (e.g. flat tile) model could be used, as for instance a second order model which allows the tile to take on a non-planar shape. Any models able to describe a surface in 3D space could be used.

Figure 11:
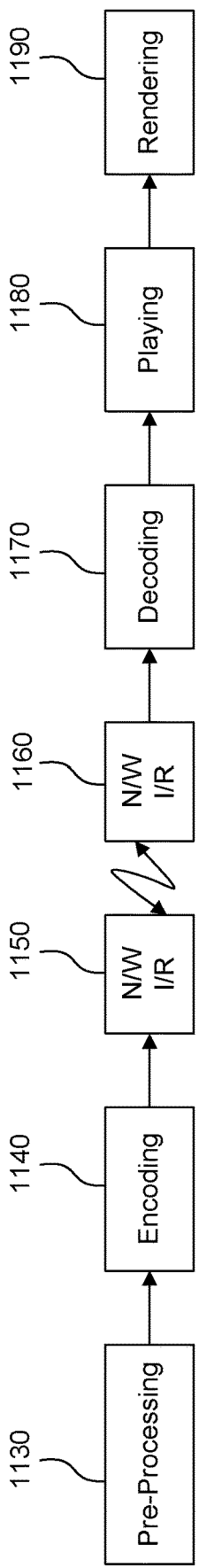
FIG. 11 schematically illustrates a general overview of an encoding and decoding system according to one or more embodiments.

FIG. 11 schematically illustrates a general overview of an encoding and decoding system according to one or more embodiments. The system of FIG. 11 is configured to perform one or more functions and can have a pre-processing module 1130 to prepare a received content (including one more images or videos) for encoding by an encoding device 1140. The pre-processing module 1130 may perform multi-image acquisition, merging of the acquired multiple images in a common space and the like, acquiring of an omnidirectional video in a particular format and other functions to allow preparation of a format more suitable for encoding. Another implementation might combine the multiple images into a common space having a point cloud representation. Encoding device 1140 packages the content in a form suitable for transmission and/or storage for recovery by a compatible decoding device 1170. In general, though not strictly required, the encoding device 1140 provides a degree of compression, allowing the common space to be represented more efficiently (i.e., using less memory for storage and/or less bandwidth required for transmission). In the case of a 3D sphere mapped onto a 2D frame, the 2D frame is effectively an image that can be encoded by any of a number of image (or video) codecs. In the case of a common space having a point cloud representation, the encoding device may provide point cloud compression, which is well known, e.g., by octree decomposition. After being encoded, the data, is sent to a network interface 1150, which may be typically implemented in any network interface, for instance present in a gateway. The data can be then transmitted through a communication network 1150, such as the internet. Various other network types and components (e.g. wired networks, wireless networks, mobile cellular networks, broadband networks, local area networks, wide area networks, WiFi networks, and/or the like) may be used for such transmission, and any other communication network may be foreseen. Then the data may be received via network interface 1160 which may be implemented in a gateway, in an access point, in the receiver of an end user device, or in any device comprising communication receiving capabilities. After reception, the data are sent to a decoding device 1170. Decoded data are then processed by the device 1180 that can be also in communication with sensors or users input data. The decoder 1170 and the device 1180 may be integrated in a single device (e.g., a smartphone, a game console, a STB, a tablet, a computer, etc.). In another embodiment, a rendering device 1190 may also be incorporated.

In one embodiment, the decoding device 1170 can be used to obtain an image that includes at least one color component, the at least one color component including interpolated data and non-interpolated data and obtaining metadata indicating one or more locations in the at least one color component that have the non-interpolated data.

Figure 12:
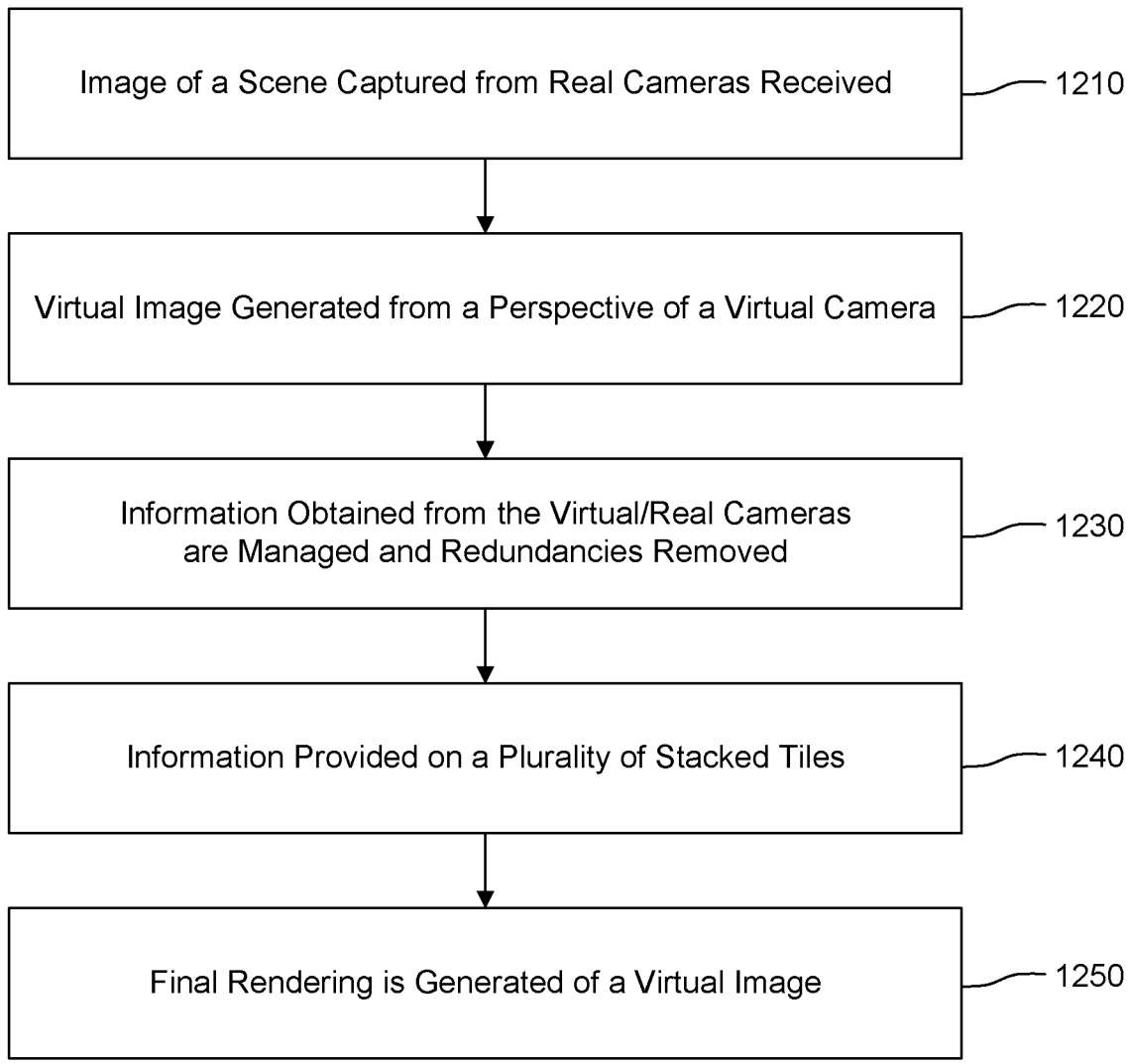
FIG. 12 is a flow chart illustration of one embodiment.

FIG. 12 is a flowchart illustration of one embodiment for processing images. In step 1210 at least an image of a scene captured from different perspectives of at least two real cameras disposed at a distance from one another is received. The scene includes at least one content, for example the content may be visual representations of objects or people. The at least an image may be a video or streaming content. In step 1220 a virtual image of the same scene is generated from a perspective of a virtual camera disposed between said at least two real cameras. In step 1230 the information obtained from the virtual and said real cameras are managed and any redundancies are removed. In step 1240 this information is provided on a plurality of stacked tiles as discussed earlier in FIGS. 7A and 7B. The tiles may be oriented as previously described. In step 1250, a final rendering is generated of a virtual image of at least one content of the scene by selectively slanting the stack such that the at least one content appears to be captured by any virtual camera disposed at any position and from any angle.

Figure 13:
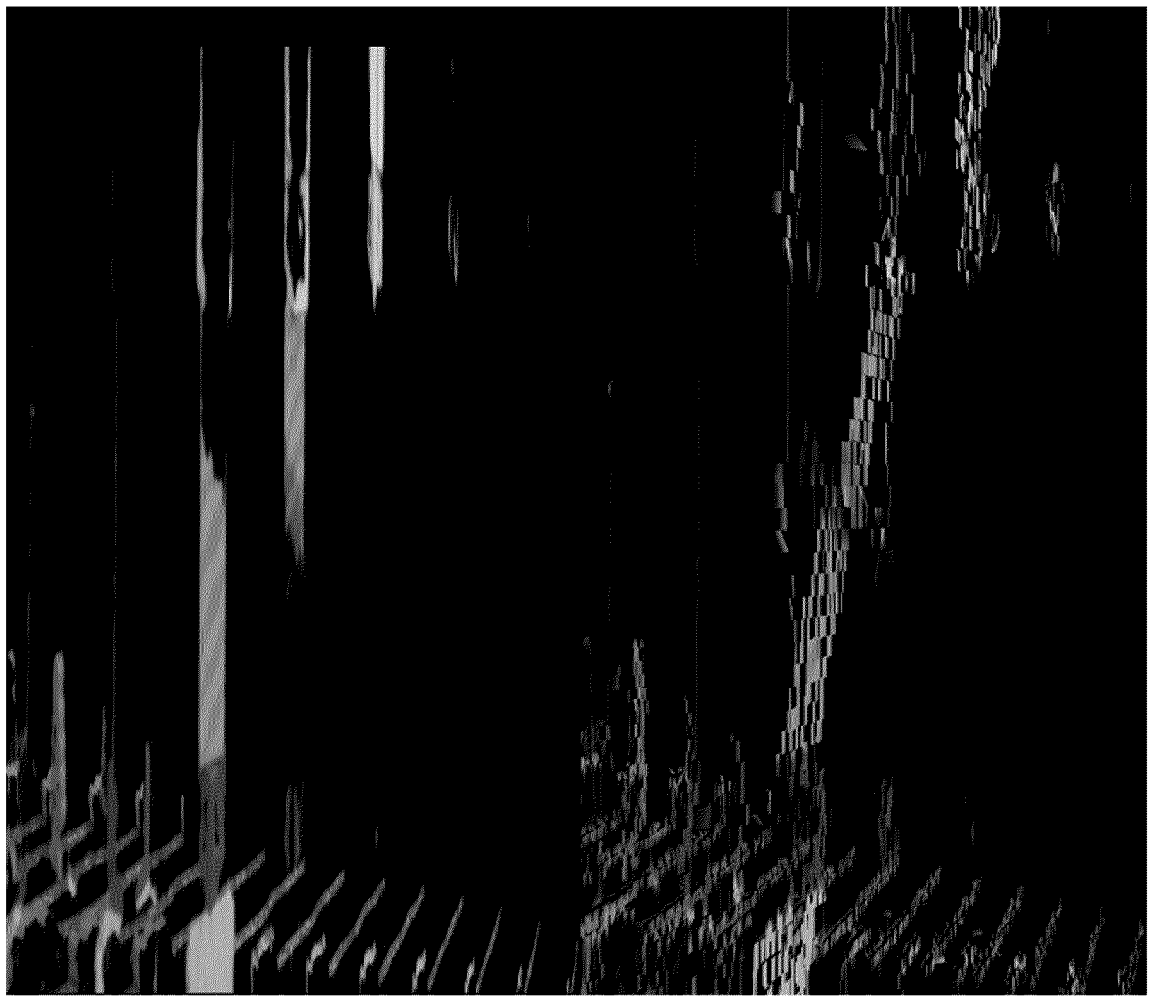
FIG. 13 compares an MPI observed from an extrapolated projection camera with a solution provided according to one embodiment.

FIG. 13 is an illustration of a synthesized image with extrapolations. The Left side shows the image generated without the oriented tiles (e.g. without the benefit of tile orientation information), while the right side shows the image generated using the oriented tiles. The number of slice(s) is S=100 in both cases. The spatial positions of the oriented tiles are specified more accurately than if the default position at the middle (e.g. at the center depth) of the slice were used. This case illustrates how oriented tiles allow for a precise location in space despite the thickness of the slices.

In one embodiment, a method or device can be implemented that can generate an enhanced multi-plane image (MPI) representation of a 3D scene. In this embodiment, the device can have a processor that can obtain an MPI representation of the scene. The MPI representation comprises a plurality of slices of content from the 3D scene, where each slice corresponds to a different depth relative to a position of a first virtual camera. Each slice is then decomposed into regular tiles and the orientation information for each of the tiles is determined. The tiles can then be stored, including their orientation information, and also information associating each tile to a slice of the MPI representation, and a tile position within the slice.

In another embodiment, a similar method and device can be used to render a view of a 3D scene. In this embodiment the MPI representation is obtained in a similar manner and then slices are decomposed and each tile orientation is also determined similarly. However, a stacked representation of each slice is then constructed. In this embodiment, each slice comprises the tiles decomposed from the slice, and each tile is oriented according to the orientation information of the tile. The content is then projected from the stacked representation of the slices to a merged image, the merged image representing a view of the 3D scene from a position of a second virtual camera.

A number of enhancements can also be implemented in either embodiment above. For example obtaining the MPI representation can comprise generating the MPI representation from a multi-view plus depth (MVD) capture of the 3D scene. Obtaining the MPI representation can also comprise computing the MPI representation from captured scene information using a deep learning algorithm.

The different depth of each slice corresponds to at least one of a minimum depth, a maximum depth, or an average depth of the slice. For each tile, the depth values for the 3D scene content of the tile and the orientation information of the tile based on depth values is determined.

In one embodiment, each slice is decomposed into regular tiles. It is then determined as which of the regular tiles contain significant content and those that have significant content would then be retained and others discarded.

In one embodiment, the orientation information for each tile, and information associating each tile to a slice of the MPI and a tile position within the slice are stored in an atlas file. In another embodiment, the orientation information for each tile, and information associating each tile to a slice of the MPI and a tile position within the slice are written to a bitstream.

Furthermore, in one embodiment, a stacked representation of the slices are constructed. Each slice comprises the tiles decomposed from the slice and each tile is oriented according to the orientation information of the tile. The content is projected from the stacked representation of the slices to a merged image, the merged image representing a view of the 3D scene from a position of a second virtual camera.

The orientation information, in one embodiment, can include one or more of: depth values for corners of the tile; a depth value for the center point of the tile; a horizontal slope value; a vertical slope value; or angular values of a surface normal of the tile.

In another embodiment, a method is introduced to render a view of the 3D scene. In this embodiment, an encoded MPI representation is obtained. The encoded MPI representation may comprise one of a bitstream or an atlas file. The encoded MPI is then decoded to obtain the tiles, as well as orientation information for each tile and information associating each tile to a slice of the MPI representation and a tile position within the slice. Each slice corresponds to a different depth relative to a position of a first virtual camera. A stacked representation of slices is then constructed and each slice comprises the tiles associated to the slice and each tile is oriented according to the orientation information. The content is then projected from the stacked representation of the slices to a merged image, the merged image representing a view of the 3D scene from a position of a second virtual camera.

The encoded MPI representation can be obtained by receiving the encoded MPI representation via a communication network. It can also be obtained by reading the encoded MPI representation from one of a file system or memory. Furthermore, the projecting of the content can include decomposing each oriented tile into a pair of triangles and determining vertex positions of each triangle of the pair of triangles so that the vertex positions can be sent to a graphics processing unit (GPU) via an application programming interface (API) such as an OpenGL.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

It should be understood that while the specification provides and discusses steps for generating an MPI representation of a 3D scene, those steps are presented by way of example to aid understanding. Therefore, it is obvious that one skilled in the art will recognize that there are various known techniques for generating an MPI representation of a 3D scene, and so our invention may be used with any known MPI generation technique.

What is claimed is:

1. A method comprising:
receiving a multi-plane image (MPI) representation of a three-dimensional (3D) image, the MPI representation comprising a plurality of slices, each slice of the plurality of slices corresponding to a different depth relative to a first position;
decomposing each slice of the plurality of slices into a plurality of tiles;
determining a position of each tile of the plurality of tiles within each slice of the plurality of slices;
determining orientation information for selected tiles of the plurality of tiles within each slice of the plurality of slices, wherein the orientation information is relative to a position and depth of a tile within a respective slice;
generating a stacked representation of the plurality of slices, wherein each slice of the stacked representation comprises a plurality of oriented tiles, wherein each oriented tile is oriented according to respective orientation information; and
generating a merged image using the stacked representation, the merged image representing a view of the 3D image relative to a second position.

2. The method of claim 1, further comprising:
determining tiles of the plurality of tiles to be discarded;
discarding the tiles of the plurality of tiles determined to be discarded; and
retaining a remainder of tiles of the plurality of tiles that were not discarded, wherein the selected tiles comprise the retained tiles.

3. The method of claim 1, wherein the orientation information comprises a depth value corresponding to at least one corner of a respective tile.

4. The method of claim 1, wherein the orientation information comprises a depth value corresponding to a center of a tile.

5. The method of claim 1, wherein the orientation information comprises a slope value of a depth of a tile.

6. The method of claim 1, wherein the orientation information comprises a value of an angle of a tile relative to a plane of a respective slice.

7. The method of claim 1, wherein the orientation information comprises a value of an angle of a tile relative to a surface that is normal to a plane of a respective slice.

8. The method of claim 1, wherein the orientation information is configured to adjust each slice of the stacked representation to be extendable outside a plane of a respective slice of the MPI representation.

9. The method of claim 1, wherein determining the orientation information for selected tiles of the plurality of tiles within each slice of the plurality of slices comprises decoding the orientation information from a bitstream.

10. The method of claim 1, wherein determining the position of each tile of the plurality of tiles within each slice of the plurality of slices comprises decoding tile position information from a bitstream.

11. A device comprising:
a processor configured to:
receive a multi-plane image (MPI) representation of a three-dimensional (3D) image, the MPI representation comprising a plurality of slices, each slice of the plurality of slices corresponding to a different depth relative to a first position;
decompose each slice of the plurality of slices into a plurality of tiles;
determine a position of each tile of the plurality of tiles within each slice of the plurality of slices;
determine orientation information for each tile of the plurality of tiles within each slice of the plurality of slices, wherein the orientation information is relative to a position and depth of a tile within a respective slice;
generate a stacked representation of the plurality of slices, wherein each slice of the stacked representation comprises a plurality of oriented tiles, wherein each oriented tile is oriented according to respective orientation information; and generate a merged image using the stacked representation, the merged image representing a view of the 3D image relative to a second position.

12. The device of claim 11, the processor further configured to:
    determine tiles of the plurality of tiles to be discarded;
    discard tiles of the plurality of tiles determined to be discarded; and
    retain a remainder of tiles of the plurality of tiles that were not discarded, wherein the selected tiles comprise the retained tiles.

13. The device of claim 11, wherein the orientation information comprises a depth value corresponding to at least one corner of a respective tile.

14. The device of claim 11, wherein the orientation information comprises a depth value corresponding to a center of a tile.

15. The device of claim 11, wherein the orientation information comprises a slope value of a depth of a tile.

16. The device of claim 11, wherein the orientation information comprises a value of an angle of a tile relative to a plane of a respective slice.

17. The device of claim 11, wherein the orientation information comprises a value of an angle of a tile relative to a surface that is normal to a plane of a respective slice.

18. The device of claim 11, wherein the orientation information is configured to adjust each slice of the stacked representation to be extendable outside a plane of a respective slice of the MPI representation.

19. The device of claim 11, wherein to determine the orientation information for selected tiles of the plurality of tiles within each slice of the plurality of slices comprises to decode the orientation information from a bitstream.

20. The device of claim 11, wherein to determine the position of each tile of the plurality of tiles within each slice of the plurality of slices comprises to decode tile position information from a bitstream.

* * * * *